Jan. 15, 1957    R. L. MERRILL ET AL    2,777,661
WEIGHING SYSTEM
Filed July 2, 1953    2 Sheets-Sheet 1
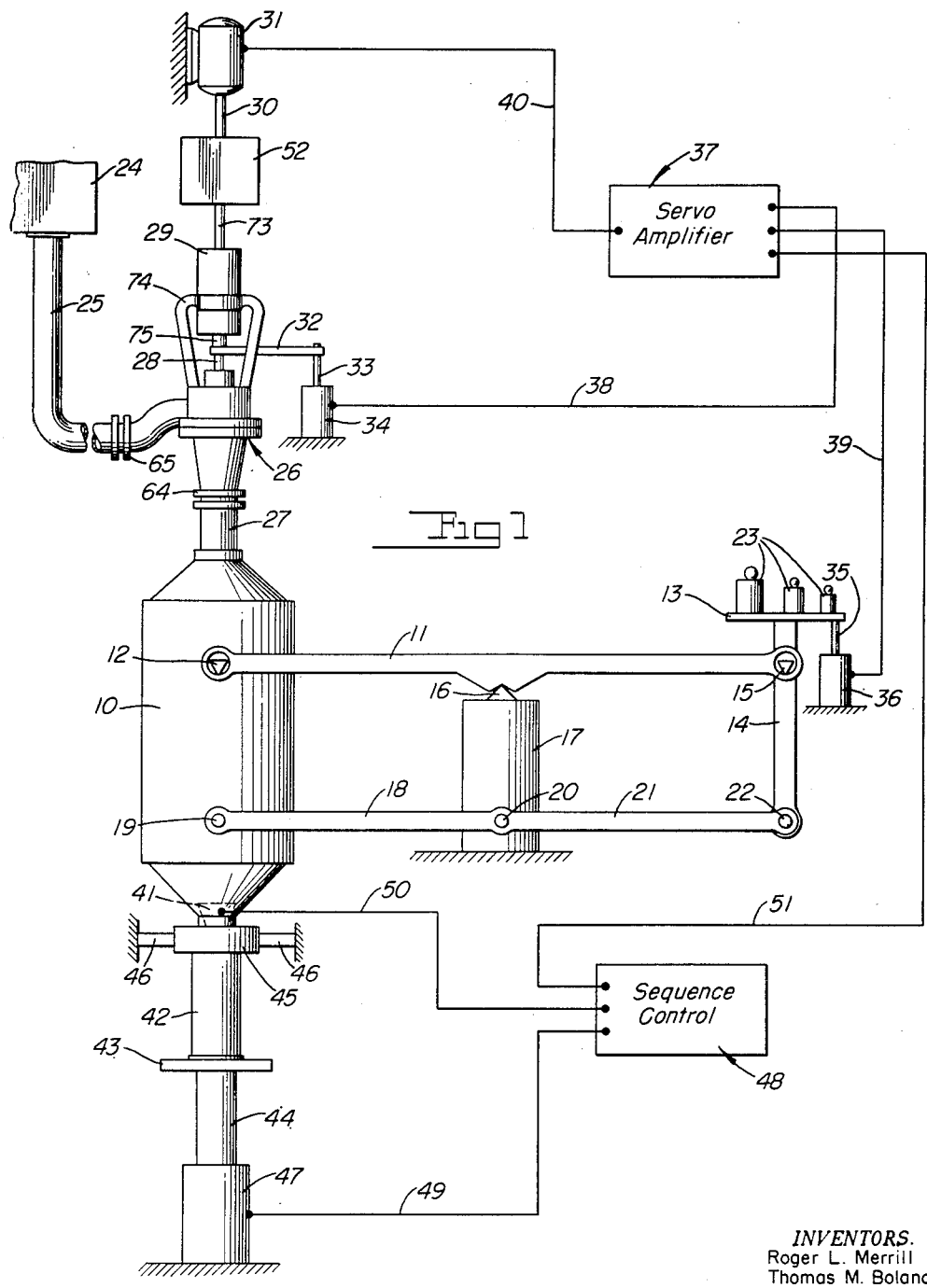
INVENTORS.
Roger L. Merrill
Thomas M. Boland
William Hecox
BY Gray, Mase,
Wildermuth, and Dunson
ATTORNEYS.

Jan. 15, 1957 R. L. MERRILL ET AL 2,777,661
WEIGHING SYSTEM
Filed July 2, 1953 2 Sheets-Sheet 2
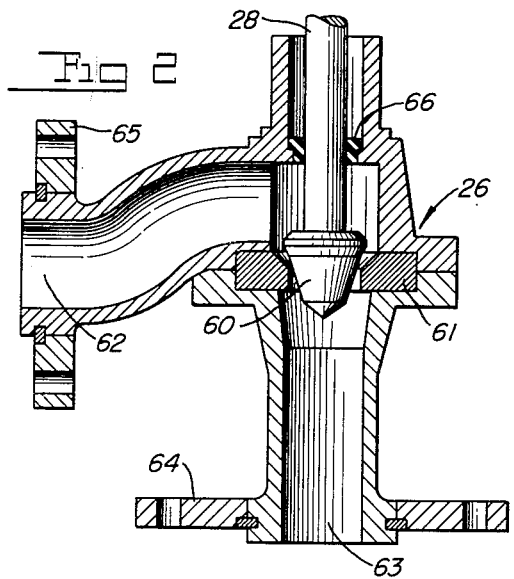
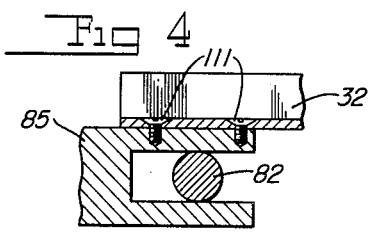
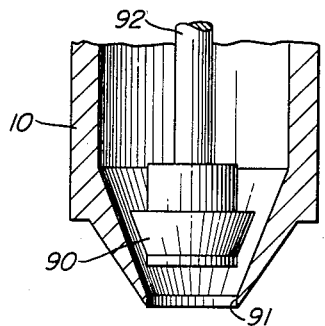
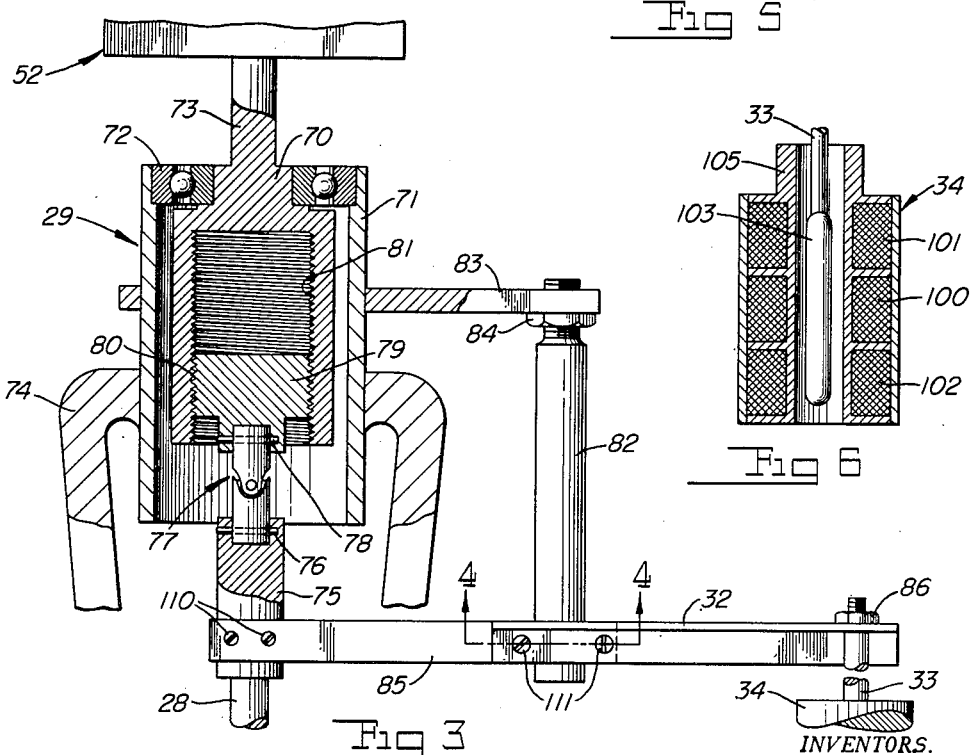
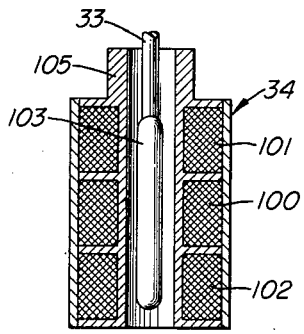
INVENTORS.
Roger L. Merrill
Thomas M. Boland
William Hecox
BY Gray, Mase,
Wildermuth, and Dinson
ATTORNEYS.

United States Patent Office 2,777,661
Patented Jan. 15, 1957

2,777,661

WEIGHING SYSTEM

Roger L. Merrill and Thomas M. Boland, Columbus, and William Hecox, Groveport, Ohio, assignors, by mesne assignments, to The Battelle Development Corporation, Franklin, Ohio, a corporation of Delaware Application July 2, 1953, Serial No. 365,730

1 Claim. (Cl. 249—3)

This invention relates to weighing systems, and, more particularly, to devices for automatically measuring a known quantity of material and dispensing the same into a container.

In the past, many devices have been designed for filling containers with a desired quantity of a material. These devices have employed various principles of operation, such as filling the container from a constant-volume receptacle, detecting the level of the material in the container, and also weighing of the material on some type of scale. The present invention is directed toward the last above-mentioned method.

In the usual type of weigh-measuring container-filling device, a container to be filled is placed on one arm of a balance scale, and the other arm is supplied with suitable weights in order that the scales attain a balance when the container has been filled to the desired amount. When the scale is at such a balance, switching means are actuated to prevent further filling of the container. These devices usually provide other switching means which are actuated prior to attaining a balance, and these switching means provide a reduction in filling rate just prior to attaining this balance, thus providing a more accurate system for filling the container to the desired amount, and lessening the danger of overfilling the container.

However, there are certain disadvantages to these weighing systems. In this type of device, the weight of the container being filled must be compensated for, since it is also placed upon the scale. This difficulty is probably not appreciable when the weight of the container is small in comparison to the weight of the filling material. However, when the weight of the container is large in comparison with the weight of the filling material, the accuracy of the weighing measurement is greatly impaired. This results from the fact that a given percentage of variation in the weight of the container will correspond to a larger absolute weight variation when the weight of the container is appreciable in respect to the weight of the filling material than when it is negligible.

Difficulties also arise in these systems when, in a large group of containers to be filled, the individual containers do not have the same weight. This necessitates compensating the scale for the weight of each individual container.

Since the usual method of reducing the rate of flow of material into the container involves the use of switches or solenoids, this reduction occurs in a finite number of steps as the balance point is approached. Although increased accuracy of measurement is obtained by increasing the number of such finite steps of control, a large number of steps would be impractical and cumbersome.

It is an object of this invention to provide an improved means for accurately filling containers with a desired quantity of filling material.

It is also an object of this invention to provide for the rapid filling of a number of containers without necessitating compensation for the wieght of the containers.

Another object of this invention is to provide, in a scale-type filling device, a proportional control of filling rate as scale balance is approached, in order that increased accuracy of filling may be obtained.

A still further object of this invention is to provide an improved automatic weighing system for filling containers on a mass-production basis.

Other objects and advantages of this invention will become apparent from the following specification, the accompanying drawings, and the appended claim.

In a preferred form of the present invention, a "weigh chamber" is positioned on one arm of a scale or other suitable weighing device. Appropriate weights are used to balance the scale in order that when the desired weight of a material has been placed in the weigh chamber the scales will balance. The position of the scale is detected continuously by an electrical device, such as a differential transformer. The output of the detecting device is fed to a servo system. A similar detecting device also detects the position of a valve which controls the flow rate of material being supplied to the weigh chamber. This device also sends a signal to the servo system. The servo system controls a servomotor, which in turn controls the position of the supply valve plug. As the scales approach a balance, the flow rate of supply material into the weigh chamber may be continually decreased. Suitable means are provided for emptying the weigh chamber into a container after the weigh chamber has been filled with a desired quantity of material.

The operation of the device of this invention is best explained by referring to the accompanying drawings, in which:

Fig. 1 is a schematic view illustrating a weighing system according to this invention as utilized in measuring desired quantities of fluids;

Fig. 2 is a cross-sectional view of a typical supply line valve for use in the weighing system of Fig. 1;

Fig. 3 is a partial cross-section view of the driving mechanism for the supply-line valve plug of Fig. 2;

Fig. 4 is a sectional view taken along the line 4—4 of Fig. 3;

Fig. 5 is a cross-sectional view of a typical dispensing valve for use in the weighing system of Fig. 1; and Fig. 6 is a cross-sectional view of a differential transformer such as may be used for detecting the position of the scale or opening of the supply line valve in the system of Fig. 1.

Referring to Fig. 1, a weigh chamber 10 is pivoted on one end of a balance arm 11 by means of a knife edge 12. A counterweight pan 13 is pivoted on the opposite end of the balance arm 11 by means of an outrider 14 and a knife edge 15. The balance arm 11 is pivoted on a knife edge 16, which is positioned on a stationary member 17. The weigh chamber 10 is held in a vertical position by means of stabilizing bar 18, which is pivotally attached to the weigh chamber at a pin joint 19, and to the stationary member 17 at a pin joint 20. The counterweight pan 13 is similarly held horizontal by means of a stabilizing bar 21 which is pivotably attached to the outrider 14 by means of a pin joint 22, and to the stationary member 17 by means of a pin joint 20. Suitable weights 23 for balancing the system may be placed on the counterweight pan 13.

Fluid from a supply tank 24 flows into the weigh chamber 10 by way of a pipe 25, a supply-line valve 26, and a pipe 27. The pipe 27 is unattached at its bottom end in order to allow for vertical movement of the weigh chamber 10, which as shown in Fig. 1 is in register with the pipe 27, said pipe 27 being of sufficient length to direct the material passing through the supply valve 26 into the chamber 10 throughout the course of vertical movement of the chamber 10 during the weighing operation. Details of the valve 26 are shown in Fig. 2, from which it is apparent that vertical movement of a valve stem 28 causes a valve plug 60 to move into or out of seating relationship with a valve seat 61. Although the valve plug 60 and the seat 61 may be designed to give any desired flow characteristic, it is preferred that the flow versus opening characteristic be linear. Fluid flowing into an inlet conduit 62 must flow through the space between the valve plug 60 and the valve seat 61, and thence to an outlet conduit 63. The relative vertical position of the valve stem 28 (and thus of the valve plug 60) to the valve seat 61 determines the rate of flow of fluids through the valve 26. Flanges 64 and 65 are provided in order to fasten the valve 26 securely to the adjoining pipes 27 and 25 respectively (Fig. 1). A seal 66 is provided around the valve stem 28 in order to prevent leakage.

Returning now to Fig. 1, the valve stem 28 extends to a drive box 29, shown in detail in Fig. 3, wherein rotational movement of a shaft 73 is translated into vertical movement of the valve stem 28. The shaft 73 is connected to a speed reducer 52, which in turn is connected to the shaft 30 of the servomotor 31. Thus, rotation of the shaft 30 causes rotation of the shaft 73 at reduced speed. An arm 32 fastened to the valve stem 28 transmits vertical movement of the valve stem to the slug 33 of a differential transformer 34. This arrangmeent is shown in more detail in Fig. 3, in which an internally threaded sleeve 70 is rotatably mounted in a casing 71 by a ball bearing means 72. A shaft 73 of the threaded sleeve 70 is attached for rotation to speed reducer 52. The upper end of the shaft 28 of the supply-line valve 26, extending through a supply-line valve yoke 74, is fixedly attached to a rod 75, which in turn is fastened by means of a pin 76 to the lower end of a universal joint 77. The upper end of the universal joint 77 is fastened by means of a pin 78 to a threaded member 79. The external threads 80 on the threaded member 79 engage the internal threads 81 on the sleeve 70.

A stabilizing rod 82 is threaded into an arm 83, and is firmly held in place by means of a threaded nut 84. The arm 83 is fixedly attached to the casing 71. A yoke 85 rides over the stabilizing rod 82, and is attached to the rod 75 as is indicated at 110. One end of the position arm 32 is fixedly attached to the yoke 85 as is indicated at 111, and the other end of this arm 32 is attached to the slug 33 of the differential transformer 34 by means of a nut 86.

It is apparent that rotational movement of the sleeve 70 driven by the shaft of the servomotor 31 will cause vertical movement of the threaded member 79, the universal joint 77, the rod 75, and the valve stem 28. The valve stem 28 is prevented from rotating by the action of the yoke 85 riding on the stabilizing rod 82. A sectional view of a portion of the yoke 85 is shown in Fig. 4.

Returning again to Fig. 1, the slug 35 of a differential transformer 36 is attached to the bottom of the weighing pan 13. Thus, any balancing movement of the pan 13 is transmitted to the slug 35, and the output voltage from the secondary of the transformer 36 is dependent upon the mechanical displacement of the pan 13, and thus proportional to the combined weight of the chamber 10 and any fluid present in said chamber. Similarly, the output voltage from the secondary of the differential transformer 34 is dependent upon the position of the valve stem 28, and is proportional to the rate of flow of fluid through the valve 26.

The differential transformers 34 and 36 are connected to the input circuit of a servoamplifier 37 by means of conductors 38 and 39 respectively. The servoamplifier output is fed to the servomotor 31 by means of conductors 40.

A dispensing valve 41 is located in the bottom end of the weigh chamber 10, in order that the fluid in the weigh chamber may be dispensed to a container 42. A typical valve that would serve this purpose is illustrated in Fig. 5, in which a valve plug 90 is positioned in the weigh chamber 10 in such a manner that vertical movement of the plug 90 will cause it to move into and out of seating arrangement with a valve seat 91 machined in the bottom of the weigh chamber 10. More complicated arrangements suitable for seating the plug may be used if desired. A valve stem 92 is attached to the valve plug 90, and vertical movement of the valve stem 92 may be caused in any convenient manner as by the action of a solenoid (not shown) on either the stem or a plunger (not shown) which may be attached to the stem 92.

In the embodiment of the invention as shown in Fig. 1, the container 42 to be filled is placed either manually or automatically on a table 43. This table is capable of being moved up and down by means of a ram 44. At its uppermost position, the ram presses the end of the container 42 into a stationary collar 45, in order that no fluids be spilled or splashed out in the filling process. When the ram is lowered, the container may be easily moved onto or off the table without interfering with the collar 45. The collar 45 is held stationary by a suitable stationary member 46. The ram control 47 is electrically connected to a sequence control unit 48 by means of conductors 49. This sequence control unit is also connected to the dispensing valve 41 by means of conductors 50, and to the servo-amplifier 37 by means of conductors 51. In addition to providing the correct sequence of operations for the system, the unit 48 also prevents fluid from entering the weigh chamber through the supply-line valve 26 when the chamber 10 is being emptied.

The principle of the differential transformers 34 and 36 used as position-detecting devices in the embodiment of this invention shown in Fig. 1, can be explained with reference to Fig. 6. Each of these devices consists basically of a primary coil 100, two secondary coils 101 and 102, a magnetic slug 103, a slug shaft 33, and a suitable housing 105. The two secondary coils are connected in series opposition, so that when the magnetic slug 103 is positioned exactly in the middle of the three coils, the total secondary output voltage is zero. As the slug is moved down, the inductive coupling is increased between the primary coil 100 and the secondary coil 102, while it is decreased between the primary coil 100 and the secondary coil 101. Therefore, the voltage output of the coil 102 is greater than that of the coil 101, and the net secondary voltage output increases as the slug moves further down. When the slug is moved upward from the center, the output of the coil 101 is greater than that of the coil 102, so that the total secondary output voltage is 180 degrees out of phase with the voltage output provided when the slug is moved down. Although these devices are useful in the present invention, other types of position-sensitive devices may also be used, such as capacity-position detectors.

The conditions of this system at the start of a filling operation are as follows:

1. The supply line valve 26 is closed;
2. The dispensing valve 41 is closed;
3. The weigh chamber 10 is empty, and
4. Weights 23 that will balance exactly the weight of the desired amount of filling material plus the weight of the weigh chamber are placed on pan 13.

When the sequence control 48 initiates a signal to begin filling the weigh chamber 10, the servoamplifier 37 detects the positions of the scale and the supply-line valve 26. This is accomplished by signals from the differential transformers 34 and 36. At this instant the voltage output from the differential transformer 36 is maximum since there is nothing in the weigh chamber 10, and the voltage output from the differential transformer 34 is zero due to the supply-line valve 26 being closed.

Under these conditions, the servoamplifier 37 drives the servomotor 31 so that the supply-line valve 26 opens wide. This causes the voltage output of the differential transformer 34 to be equal, but of opposite phase, to the voltage output of the differential transformer 36. Thus, the net series voltage of the two transformers is zero. This condition remains until the scale approaches balance. The opening of the supply-line valve 26 causes fluid from the supply tank 24 to flow into the weigh chamber 10.

As the desired amount of fluid in the chamber 10 is approached, the scale moves toward balance. The output of the differential transformer 36 thereby decreases, and the servoamplifier 37 immediately detects the excess voltage input applied to it from the differential transformer 34. The servomotor 31 is thus driven to provide closing of the supply-line valve 26 until the net voltage input to the servoamplifier is once more zero. In this manner, the opening in the supply-line valve 26 is continuously decreased as a balance is neared. The action of the servoamplifier 37 prevents closing of the valve 26 too rapidly. This closing continues until the valve is finally closed completely. When the scale is balanced, the desired quantity of fluid is in the weigh chamber 10.

While this operation is taking place, a container 42, to be filled, is placed either manually or automatically onto the table 43, and the ram 44, actuated by the sequence-control unit 48, presses the upper end of the container into the stationary collar 45 in order that no fluids be spilled or splashed during the dispensing operation.

When the desired amount of fluid has been fed into the weigh chamber 10, the sequence control disconnects the servoamplifier 37 from the two differential transformers, thereby keeping the supply valve 26 shut. Also at this time, the dispensing valve 41 at the bottom of the weigh chamber 10 is opened and the fluid flows into the container 42.

When the weigh chamber 10 is empty, the differential transformers 34 and 36 are reconnected to the servoamplifier 37, and the weigh chamber 10 again begins to receive fluid from the supply tank 24.

The positioning and removal of the container 42 on the table 43 are accomplished while the weigh chamber 10 is being filled, thereby permitting a maximum number of containers to be filled during a given time.

From the foregoing specification, it is seen that this invention provides a rapid and efficient method for accurately filling containers with a desired amount of material, and that this system requires only a minimum amount of calibrating adjustments for filling a plurality of containers.

What is claimed is:

An apparatus for filling containers with a predetermined weight of a fluid comprising a weigh chamber, a servo-controlled flow valve for directing a flow of fluid into said chamber, a servomotor means for varying the flow rate of said fluid through said control valve, servo-amplifying means connected to first circuit means and to said servomotor means, scale balance means, said chamber being balanced on one arm of said balance means, weight means on the other arm of said balance means, said weight means balancing said balancing means when said predetermined weight of fluid is present in said chamber, a first differential transformer operatively associated with said balance means and providing first output voltage from it, secondary windings depending upon the mechanical displacement of said balance means, a second differential transformer associated with said flow valve and providing a second output voltage from its secondary windings proportional to said flow rate, said first differential transformer being positioned to provide no output voltage when said balancing means is balanced, said second differential transformer being positioned to provide no output voltage when said flow valve is closed and said flow is thereby stopped, second circuit means connecting said secondary windings in series opposition to the input circuit of said servoamplifier means, so that the resultant voltage difference of the two said output voltages incident to said flow of material into said chamber causes actuation of said servomotor means to continuously reduce said flow rate during a filling cycle and to stop said flow when said predetermined weight is present in said chamber, an emptying valve in said chamber positioned to empty said chamber into a container positioned below said emptying valve, and sequence-control means for preventing said flow during emptying through said emptying valve and for preventing emptying through said emptying valve until said predetermined weight of fluid is present in said chamber and said flow has stopped.

References Cited in the file of this patent

UNITED STATES PATENTS

| | | |
|---|---|---|
| 809,026 | Snypp | Jan. 2, 1906 |
| 2,067,743 | Weckerly | Jan. 12, 1937 |
| 2,451,891 | Vagim | Oct. 19, 1948 |
| 2,491,049 | Johannessen | Dec. 13, 1949 |
| 2,503,295 | Palmer | Apr. 11, 1950 |
| 2,581,204 | Reilly | Jan. 1, 1952 |
| 2,581,205 | Reilly | Jan. 1, 1952 |
| 2,680,012 | Bozoian | June 1, 1954 |

FOREIGN PATENTS

| | | |
|---|---|---|
| 713,044 | Germany | Oct. 30, 1941 |